(12) United States Patent
Eid et al.

(10) Patent No.: US 12,199,346 B2
(45) Date of Patent: Jan. 14, 2025

US012199346B2

(54) HIGH GAIN AND LARGE BEAMWIDTH ROTMAN-LENS-BASED AND MM-WAVE BACKSCATTERING AND ENERGY HARVESTING SYSTEMS AND ASSOCIATED METHODS

(71) Applicant: Georgia Tech Research Corporation, Atlanta, GA (US)

(72) Inventors: Aline Eid, Atlanta, GA (US); Jimmy Georges Donald Hester, Atlanta, GA (US); Emmanouil Tentzeris, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 143 days.

(21) Appl. No.: 18/008,244

(22) PCT Filed: Jun. 18, 2021

(86) PCT No.: PCT/US2021/038128
§ 371 (c)(1),
(2) Date: Dec. 5, 2022

(87) PCT Pub. No.: WO2022/051013
PCT Pub. Date: Mar. 10, 2022

(65) Prior Publication Data

US 2023/0208054 A1 Jun. 29, 2023

Related U.S. Application Data

(60) Provisional application No. 63/040,684, filed on Jun. 18, 2020.

(51) Int. Cl.

| | |
|---|---|
| ***H01Q 25/00*** | (2006.01) |
| ***H01Q 1/24*** | (2006.01) |
| ***H01Q 21/00*** | (2006.01) |

(52) U.S. Cl.
CPC ........... *H01Q 25/008* (2013.01); *H01Q 1/248* (2013.01); *H01Q 21/0031* (2013.01)

(58) Field of Classification Search
CPC ...................................................... H01Q 15/06
(Continued)

(56) References Cited

U.S. PATENT DOCUMENTS 9,620,865 B2 * 4/2017 Nagaishi ............ H01Q 21/0031
9,715,609 B1 * 7/2017 Fink ....................... H01Q 25/00
(Continued)

FOREIGN PATENT DOCUMENTS

KR 101306784 B1 * 9/2013 ......... H01Q 21/0031
WO WO8009066 A1 * 11/1988 ........... H01Q 25/008

OTHER PUBLICATIONS

A. Eid, J. G. D. Hester and M. M. Tentzeris, "Rotman Lens-Based Wide Angular Coverage and High-Gain Semipassive Architecture for Ultralong Range mm-Wave RFIDs," in IEEE Antennas and Wireless Propagation Letters, vol. 19, No. 11, pp. 1943-1947, Nov. 2020, doi: 10.1109/LAWP.2020.3002924 (Year: 2020).*
(Continued)

*Primary Examiner* — Hoang V Nguyen
*Assistant Examiner* — Brandon Sean Woods
(74) *Attorney, Agent, or Firm* — Troutman Pepper Hamilton Sanders LLP; Ryan A. Schneider; Dustin B. Weeks

(57) ABSTRACT

The disclosed technology includes device, systems, techniques, and methods for mm-wave backscattering and energy harvesting systems utilizing a Rotman-Lens-based rectenna system. An mm-wave backscattering and energy harvesting system can include one or more antenna, a Rotman Lens having a beam port side and an antenna side in electrical communication with the one or more antenna, and a switching network in electrical communication with
(Continued)

the beam port side of the Rotman Lens. The switching network can be configured to cause the system to operate in either a backscattering mode or an energy harvesting mode.

21 Claims, 16 Drawing Sheets

(58) Field of Classification Search
USPC .......................................................... 343/700
See application file for complete search history.

(56) References Cited

U.S. PATENT DOCUMENTS 9,977,121 B1 * 5/2018 Fink ...................... H01Q 25/00
10,243,412 B1 3/2019 Fink et al.
2005/0099222 A1 5/2005 Yang
2016/0301257 A1 10/2016 Parks et al.
2020/0091604 A1 3/2020 Roitberg et al.
2020/0403310 A1 * 12/2020 Merola ................ H01Q 25/008

OTHER PUBLICATIONS

International Search Report and Written Opinion From Application No. PCT/US2021/038128 dated May 4, 2022.
"Rotman Lens-Based Wide Angular coverage and High gain Semi-Passive Architecture for Ultra-Long Range mm-Wave RFIDs," Jun. 15, 2020, IEEE Antennas and Wireless Propagation Letters.
Extended European Search Report from Application No. 21864853.3 dated May 23, 2024.
Eid, et al., "A Scalable High-Gain and Large-Beamwidth mm-wave Harvesting Approach for 5G-powered IoT", 2019 IEEE MTT-S International Microwave Symposium (IMS), IEEE, Jun. 2, 2019, pp. 1309-1312.

* cited by examiner

HIGH GAIN AND LARGE BEAMWIDTH ROTMAN-LENS-BASED AND MM-WAVE BACKSCATTERING AND ENERGY HARVESTING SYSTEMS AND ASSOCIATED METHODS

CROSS-REFERENCE TO RELATED APPLICATIONS

This application claims priority to, and the benefit under 35 U.S.C. § 119(e), of U.S. Provisional Patent Application No. 63/040,684, filed 18 Jun. 2020, the entire contents and substance of which are hereby incorporated by reference as if fully set forth below.

STATEMENT OF RIGHTS UNDER FEDERALLY SPONSORED RESEARCH

This invention was made with government support under Award Nos. FA9550-18-1-0191 and 800009491-01UG/00016 from the United States Air Force. The government has certain rights in the invention.

FIELD OF INVENTION

Examples of the present disclosure relate to a systems and methods for mm-wave backscattering and energy harvesting systems utilizing a Rotman-Lens-based rectenna system, and more particularly to systems and methods for mm-wave backscattering and energy harvesting systems having a Rotman Lens network connected to a dual phased backend configured to operate in either a backscattering mode or an energy harvesting mode.

BACKGROUND

By the end of 2020, it is projected that roughly 50 billion Internet of Things (IoT) devices will be installed. The massive increase in devices creates an explosive growth of mobile traffic demand. The fifth generation (5G) of wireless networks addresses this problem through incorporation of the millimeter wave (mmWave) band, which runs from ~30 GHz to ~300 GHz, into these 5G networks. The mmWave band is advantageous is that it allows for higher effective isotropic radiated power of antennas, thus allowing for longer range transmission. Such capabilities allow for longer ranges and between transmission and reception devices (e.g., base stations and sensors). Additionally, with the massive increase in devices comes a massive increase in energy required to power such devices. Accordingly, the design and realization of energy-autonomous, self-powered systems (e.g., perpetual power for IoT devices) is therefore highly desirable.

One potential way of satisfying these goals is through electromagnetic energy harvesting. The electromagnetic energy present in the 5G networks, especially in the mmWave band where the limits of allowable transmitted power by the FCC regulations are pushed beyond that of their lower-frequency counterparts, presents great opportunity for energy harvesting systems. Due to the narrower beamwidths present in the mmWave band, single mmWave antennas have a very small footprint (e.g., 3 mm×3 mm for a single patch antenna). However, to harvest enough electromagnetic energy, large aperture antennas are required. Accordingly, to harvest enough electromagnetic energy from mmWave bands, modular antennas arrays are utilized instead of single elements of the small mmWave antennas.

However, one limitation accompanies large gain antennas arrays is the inability to provide an isotropic angular coverage. As the relative orientations of the sources and harvesters are generally unknown, the use of large aperture mmWave harvesters presents large challenges.

Individual rectennas, constituted of small antenna elements, can be dc combined. However, this approach does not increase the sensitivity (lowest turn-on power) of the overall rectenna system. Such an increase in sensitivity can only be achieved through RF combining. Additionally, beamforming networks (BFNs) are used to effectively create simultaneous beam angular coverage with large-gain arrays, by mapping a set of directions to a set of feeding ports. Common techniques rely on the integration of active devices to achieve amplitude or phase variations for electronically scanning antenna arrays. This approach can be costly and lossy for these antenna arrays, especially when a large number of beams need to be scanned. Further, hybrid combination techniques based on Butler matrix networks have been used for energy harvesting at lower frequencies to achieve wider angular coverage harvesting. Such techniques rely on ultra-high-frequency (UHF) arrays, which are impractically large for IoT applications and the implementation of their Butler matrices at higher frequencies would necessitate costly high-resolution fabrication.

Therefore, there exists the need for a new generation of sensing devices and systems capable of high gain and large angular coverage energy harvesting.

SUMMARY

Some or all of the above deficiencies may be addressed by certain embodiments of the disclosed technology. Disclosed embodiments provide semi-passive and fully passive RFID systems and methods.

An exemplary embodiment provides a semi-passive RFID system having one or more antenna, a Rotman Lens having a beam port side and an antenna side in electrical communication with the one or more antenna, a plurality of mm-wave switches in electrical communication with the beam port side of the Rotman Lens, and a power generation circuit.

In any of the embodiments disclosed herein, the power generation circuit may further comprise an oscillator, a voltage regulator, and a power source.

In any of the embodiments disclosed herein, the power source can further comprise a solar cell.

In any of the embodiments disclosed herein, each of the one or more antenna can further comprise one or more serially fed patch antenna.

In any of the embodiments disclosed herein, each of the one or more antenna can further comprise an omni-directional antenna.

In any of the embodiments disclosed herein, the antenna side of the Rotman Lens can comprise one or more antenna ports.

In any of the embodiments disclosed herein, each of the one or more antenna ports of the antenna side of the Rotman Lens can be in electrical communication with a respective antenna of the one or more antenna.

In any of the embodiments disclosed herein, there can be 8 antenna ports of the antenna side of the Rotman Lens and 8 antennas.

In any of the embodiments disclosed herein, the beam port side of the Rotman Lens can comprise a plurality of beam ports.

In any of the embodiments disclosed herein, a respective switch of the plurality of switches can be connected to each of the plurality of beam ports.

Another embodiment provides a fully-passive RFID system having one or more antenna, a Rotman Lens having a beam port side and an antenna side in electrical communication with the one or more antenna, a plurality of single pole double throw switches in electrical communication with the beam port side of the Rotman Lens, a backscattering circuit electrically connected to a first output of each of the plurality of single pole double throw switches, and an energy harvesting circuit electrically connected to (i) a second output and (ii) a control input of each of the plurality of single pole double throw switches.

In any of the embodiments disclosed herein, the energy harvesting circuit can be configured to generate a control signal for controlling each of the plurality of single pole double throw switches.

In any of the embodiments disclosed herein, the energy harvesting circuit can comprise a plurality of rectifiers and a power combining circuit.

In any of the embodiments disclosed herein, each rectifier of the plurality of rectifiers can comprise a rectifying diode.

In any of the embodiments disclosed herein, the power combining network can comprise a plurality of bypass diodes.

In any of the embodiments disclosed herein, the number of bypass diodes can be equivalent to $2\times N$, wherein N is the number of rectifying diodes.

In any of the embodiments disclosed herein, the number of bypass diodes can be equivalent to $2\times(N-1)$, wherein N is the number of rectifying diodes.

In any of the embodiments disclosed herein, the system can be configured provide at least 110° angular coverage at 28 GHz.

Another embodiment provides an electronic device having an environmental sensor and a fully passive RFID system.

In any of the embodiments disclosed herein, the fully-passive RFID system can include one or more antenna, a Rotman Lens having a beam port side and an antenna side in electrical communication with the one or more antenna, a plurality of single pole double throw switches in electrical communication with the beam port side of the Rotman Lens, a backscattering circuit electrically connected to a first output of each of the plurality of single pole double throw switches, and an energy harvesting circuit electrically connected to (i) a second output and (ii) a control input of each of the plurality of single pole double throw switches.

Another embodiment provides method of manufacturing an mm-wave RFID system comprising providing a first flexible substrate, printing, on the first flexible substrate a Rotman-based rectenna architecture, affixing a switching network to the flexible substrate on the beam port side of the Rotman Lens, affixing a backscattering circuit to the flexible substrate such that the backscattering circuit is in communication with a first output of the switching network, and affixing an energy harvesting circuit to the flexible substrate such that the energy harvesting circuit is in communication with a second output of the switching network.

In any of the embodiments disclosed herein, the Rotman-based rectenna architecture can comprise one or more antenna, and a Rotman Lens having a beam port side and an antenna side in electrical communication with the one or more antenna.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
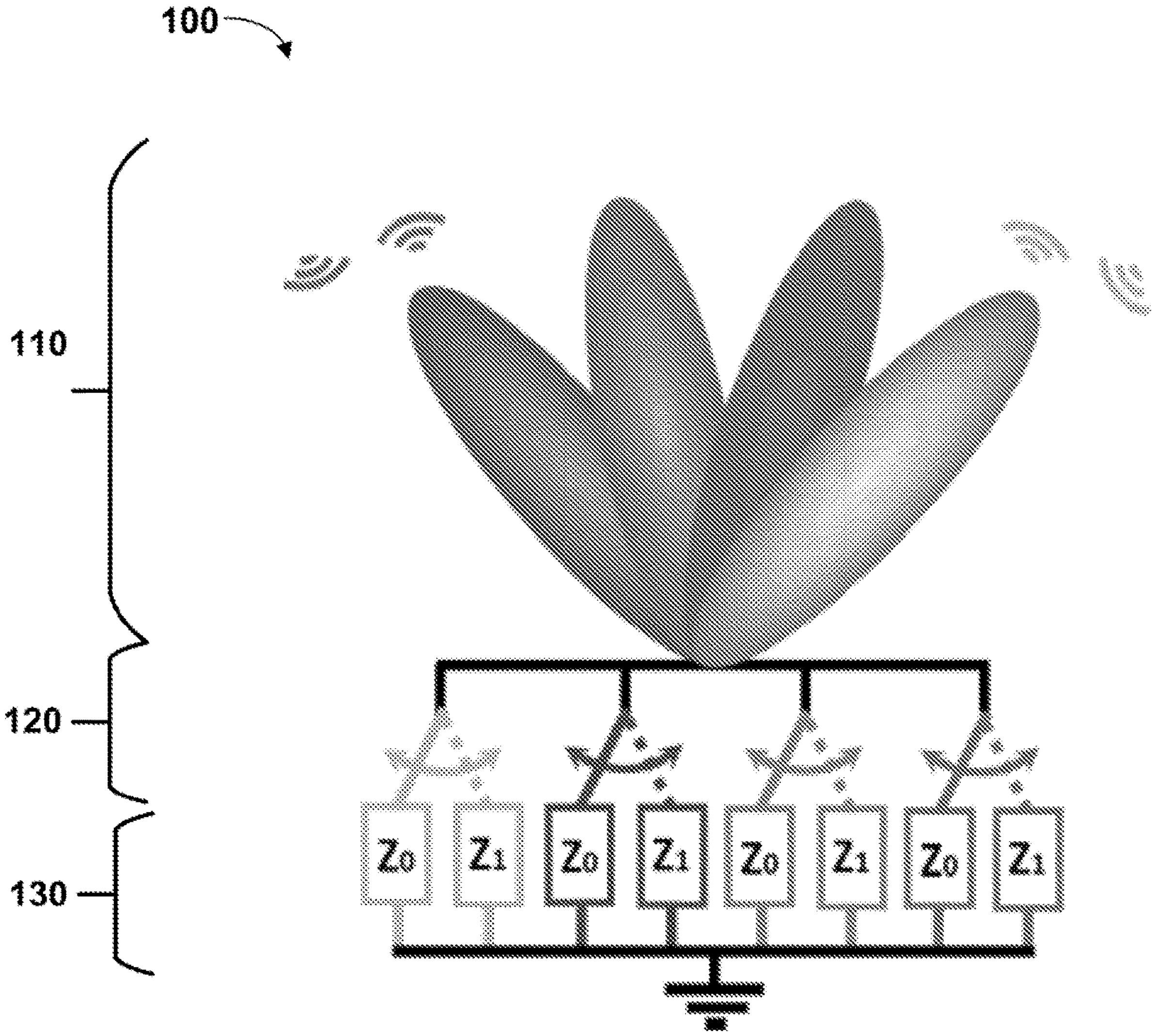
FIG. 1 depicts a block diagram of a Rotman lens-based retrodirective backscatter front end system, in accordance with an example of the present disclosure.

As described herein, embodiments of the disclosed technology include systems and methods for mm-wave backscattering and energy harvesting systems utilizing a Rotman-Lens-based rectenna system, and more particularly to systems and methods for mm-wave backscattering and energy harvesting systems having a Rotman Lens network connected to a switch-controlled dual phased backend configured to operate in either a backscattering mode or an energy harvesting mode. The Rotman lens can be designed to focus energy coming from a given direction into its geometrically associated beam ports. Each beam port can be loaded with a switch configured to change between a dual-phased backend. The backscattering phase can be configured to modulate the reflected signal. The energy harvesting phase can include a power management circuit to channel and combine the energy coming from any direction. As will be appreciated, such a design allows the energy harvesting system to provide power to a load regardless of which rectifier is providing the power.

Such characteristics and advantages make energy harvesting systems and devices that incorporate them ideal candidates for inclusion in next generation wireless communication systems to address the rising demand for mobile traffic, such as 5G communication, which will likely incorporate high speed modulation and mmWave band carriers running from 20 GHz to 300 GHz. The 24 GHz, 28 GHz, 33 GHz, 37 GHz, 39 GHz and 42 GHz bands are specific bands that will likely play a role in future 5G communications devices. While such bands offer the benefit of increased power transmission, they also pose significant challenges for energy harvesting due to mobility the directional dependence of mmWave communications. Specifically, the Rotman-Lens-based rectenna system of the proposed energy harvesting system which maps beam direction to a port to allow for beam steering makes the proposed design well suited to overcome the challenges of 5G and mmWave communication. In a certain embodiment of the present invention, an energy harvesting system that can support high gain and large beam width energy harvesting through quasi-isotropic RF combining is presented.

Further, the described systems and methods herein can enable digital twinning technology in scenarios such as smart cities or smart agriculture, for which billions of IoT devices will be deployed and will be required to be energy-autonomous and able to communicate sensing and identifications data. For example, described herein are both semi and fully passive mm-wave RF tags. By connecting sensors to such RFID tags and placing them on buildings, bridges, roads, etc. (in the scenario of smart cities) or in agricultural fields, in the vicinity of 5G/mm-wave base-stations, fully-energy-sustained IoT sensors capable of being powered and interrogated using cellular infrastructure can be realized.

Throughout this disclosure, certain embodiments are described in exemplary fashion in relation to Internet-of-Things technology such as nest thermostats, connected appliances, devices associated with emerging applications such as augmented reality (AR), virtual reality (VR), and mixed reality (MR), and other similar devices. However, embodiments of the disclosed technology are not so limited. In some embodiments, the disclosed technique may be effective in other 5G, mmWave communication, and radar applications. Moreover, embodiments of the disclosed technique may be used in a variety of communication devices, such as smart phones, tablets, 5G systems such as mobile handsets and base-station units.

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to examples of the disclosed technology, examples of which are illustrated in the accompanying drawings and disclosed herein. Wherever convenient, the same references numbers will be used throughout the drawings to refer to the same or like parts.

FIG. 1 depicts a block diagram of a Rotman lens-based retrodirective backscatter front end system 100, in accordance with an example of the present disclosure. As shown, retrodirective backscatter front end system 100 can include a receiving stage 110, a switching stage 120, and a load stage 130. Retrodirective backscatter front end system 100 of FIG. 1 can be used to receive electromagnetic energy from one or more input signal and backscatter the signal. As further discussed below, receiving stage 110 can include one or more components configured to receive electromagnetic energy and a Rotman lens. The Rotman lens can focus the energy coming from a given direction into a geometrically associated beam port of the lens. The ports can be connected to the switch stage 120, which can include one or more components configured to shifts between two phases in the load stage 130 to modulate the reflected signal. Often, this second switch is dispensed with and the modulation is implemented by simply switching between a first load ($z_0$) and a second load ($z_1$).

Figure 2:
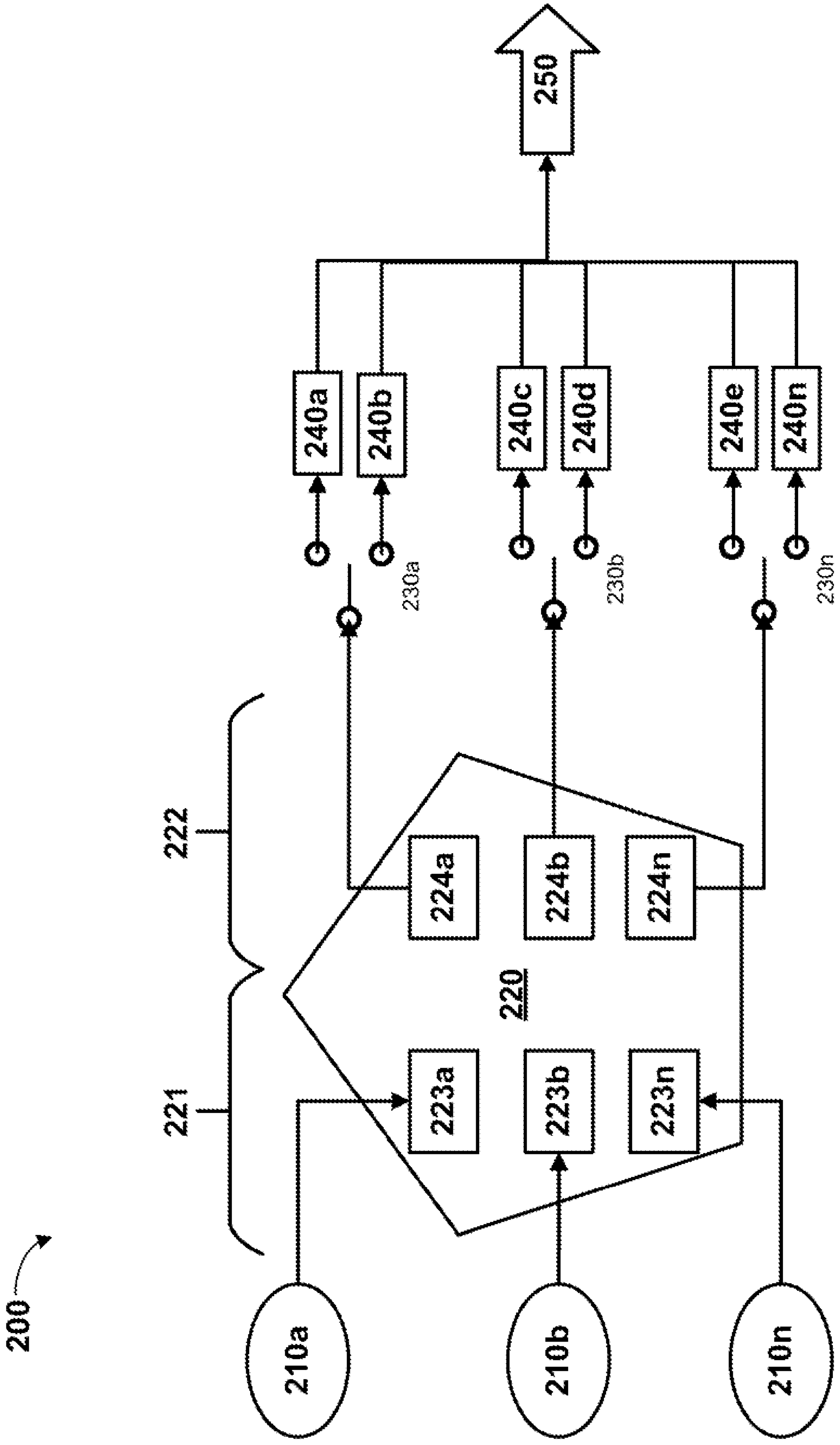
FIG. 2 is a system diagram of a Rotman lens-based retrodirective backscatter front end system, in accordance with an example of the present disclosure.

FIG. 2 is a system diagram of a Rotman lens-based retrodirective backscatter front end system 200, in accordance with an example of the present disclosure. As shown, retrodirective backscatter front end system 200 can include one or more antenna 210_a_-210_n_, a Rotman lens 220 having an antenna side 221 and a beam port side 222, one or more switches 230_a_-230_n_, each switch connected to first and second loads 240_a_-240_n_, and an output 250. As further depicted, Rotman lens 220 may include one or more antenna port 223_a_-223_n_ and one or more beam port 224_a_-224_n_. The one or more antenna port 223_a_-223_n_ of the antenna side 221 of the Rotman lens 220 can be in electrical communication with a respective antenna of the one or more antenna 210_a_-210_n_. The one or more beam port 224_a_-224_n_ of the beam port side 222 of the Rotman lens 220 can be in electrical communication with a respective switch of the one or more switches 230_a_-230_n_. Retrodirective backscatter front end system 200 of FIG. 2 can be used to receive electromagnetic energy, by one or more antenna 210_a_-210_n_, focus the energy, by a Rotman lens 220, onto one or more switches 230_a_-230_n_, and then modulate the reflected signal by passing it through the selected load of the one or more loads 240_a_-240_n_ into an output line 250.

The one or more antenna 210$a$-210$n$ can be a wideband, multiband and/or broadband antenna, having a frequency range, capable of receiving energy signals from the frequency range. The frequency range can be selected for the availability of regulated and unregulated frequencies and/or selected for energy patterns in ambient noise. The one or more antenna 210$a$-210$n$ can include an antenna array. For example, and as further discussed with respect to FIG. 3, the one or more antenna 210$a$-210$n$ can include a plurality of serially fed patch antennas. Further, the one or more antenna 210$a$-210$n$ can include a fractal antenna. Fractal antennas are compact multiband and/or wideband antennas capable of receiving energy signals within a frequency range of the fractal antenna. Fractal antennas may also be configured to receive energy signals at specific frequencies with the frequency range of the fractal antenna. Further, the one or more antenna 210$a$-210$n$ can be enabled with linear, circular, or (more generally) elliptical polarization capabilities. As will be appreciated, such a design is important in that it provides the system with the ability to re-emit the received signals in a polarization that is orthogonal to the impinging wave and to, therefore, increase the detection range of the system.

As previously mentioned, Rotman lens 220 can include an antenna side 221 having one or more antenna port 223$a$-223$n$. The one or more antenna port 223$a$-223$n$ of the antenna side 221 of the Rotman lens 220 can be in electrical communication with a respective antenna of the one or more antenna 210$a$-210$n$. As the antenna side 221 of the Rotman lens 220 receives an input signal from the one or more antenna 210$a$-210$n$, the Rotman lens 220 can focus the energy coming from input signal to the beam port side 222 of the Rotman lens 220. For example, the Rotman lens 220 can focus energy coming from input signal to the one or more beam port 224$a$-224$n$ of the beam port side 222 of the Rotman lens 220.

As will be appreciated, the Rotman lens 220 operates just like an optical lens, by introducing differential propagation time delays to wavefronts impinging onto the various points of its surface. A significant advantage of this structure is its introduction of true-time delays (TTDs), which translate to ultra-wideband operation. By properly tuning the shape of the lens according to the geometrical optics approximation with the goal of focalizing plane waves impinging on the antenna side 221 of the Rotman lens 220 to different focal points on the beam-ports side 222 of the Rotman lens 220, one achieves a lens-shaped structure with two angles of curvatures, one on the beam-ports side 222 and the other on the antenna side 221. As will be further appreciated, the tuning process maps a set of selected radiation directions to an associated set of beam-ports. Tuning these parameters, by varying the number of antennas ports 223$a$-223$n$ and beam ports 224$a$-224$n$ influences the array factor, the angular coverage, and the overall performance. In an example, the Rotman lens 200 includes six beam ports 224$a$-224$n$ and eight antenna ports 223$a$-223$n$. In another example, the Rotman lens 200 includes twelve beam ports 224$a$-224$n$ and sixteen antenna ports 223$a$-223$n$. Further, tapers can be included on both sides of the Rotman lens 220 to create smooth impedance transitions from the input impedance of the one or more antenna 210$a$-210$n$ to that experienced by the wave in the Rotman lens 220 and, subsequently, from the Rotman lens 220 to the impedance of the beam ports 224$a$-224$n$.

Figure 3:
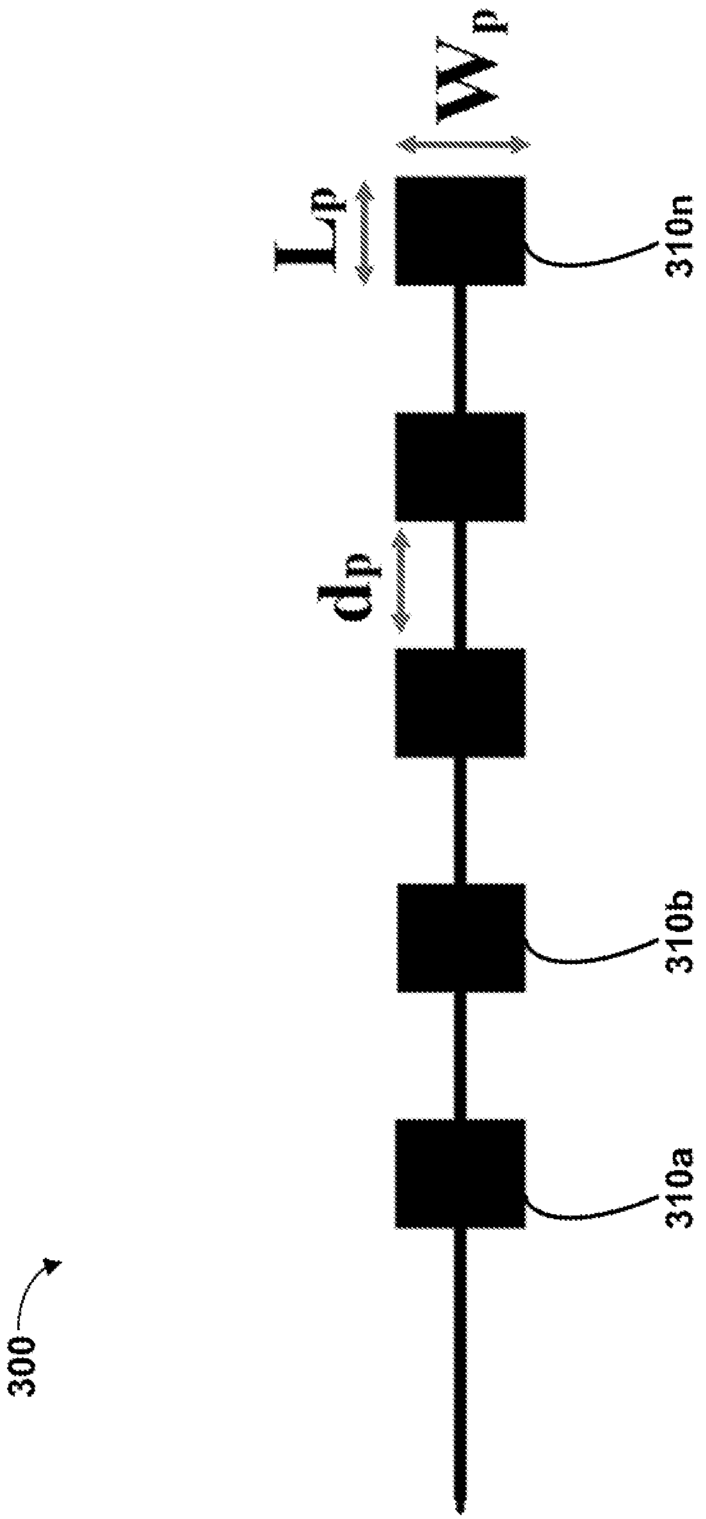
FIG. 3 is a schematic of antenna array, in accordance with an example of the present disclosure.

FIG. 3 is a schematic of antenna array 300, in accordance with an example of the present disclosure. As will be appreciated, antenna array 300 may be desirable for integration into energy harvestings systems as they are scalable and allow for fine control over the aperture of the antenna. As depicted, antenna array 300 can include a plurality of serially fed patch antennas 310$a$-310$n$ having a length ($L_p$), width ($W_p$), and distance between antennas ($d_p$). For example, antenna array 300 can include five serially-fed patch antennas 310$a$-310$n$ having the following dimensions: $L_p$=2.9 mm, $W_p$=3.35 mm, and $d_p$=3.32 mm and providing an operation centered at 28.55 GHz and having a reflection coefficient lower than 20 dB. As will be appreciated, such dimensions and number of antennas can be varied in order to vary the operational point of the antenna array 300. Additionally, antenna array 300 can be manufactured on various substrates. For example, antenna array 300 can be printed on copper-clad liquid crystal polymer (LCP) using an inkjet-printed masking technique followed by etching.

Figure 4:
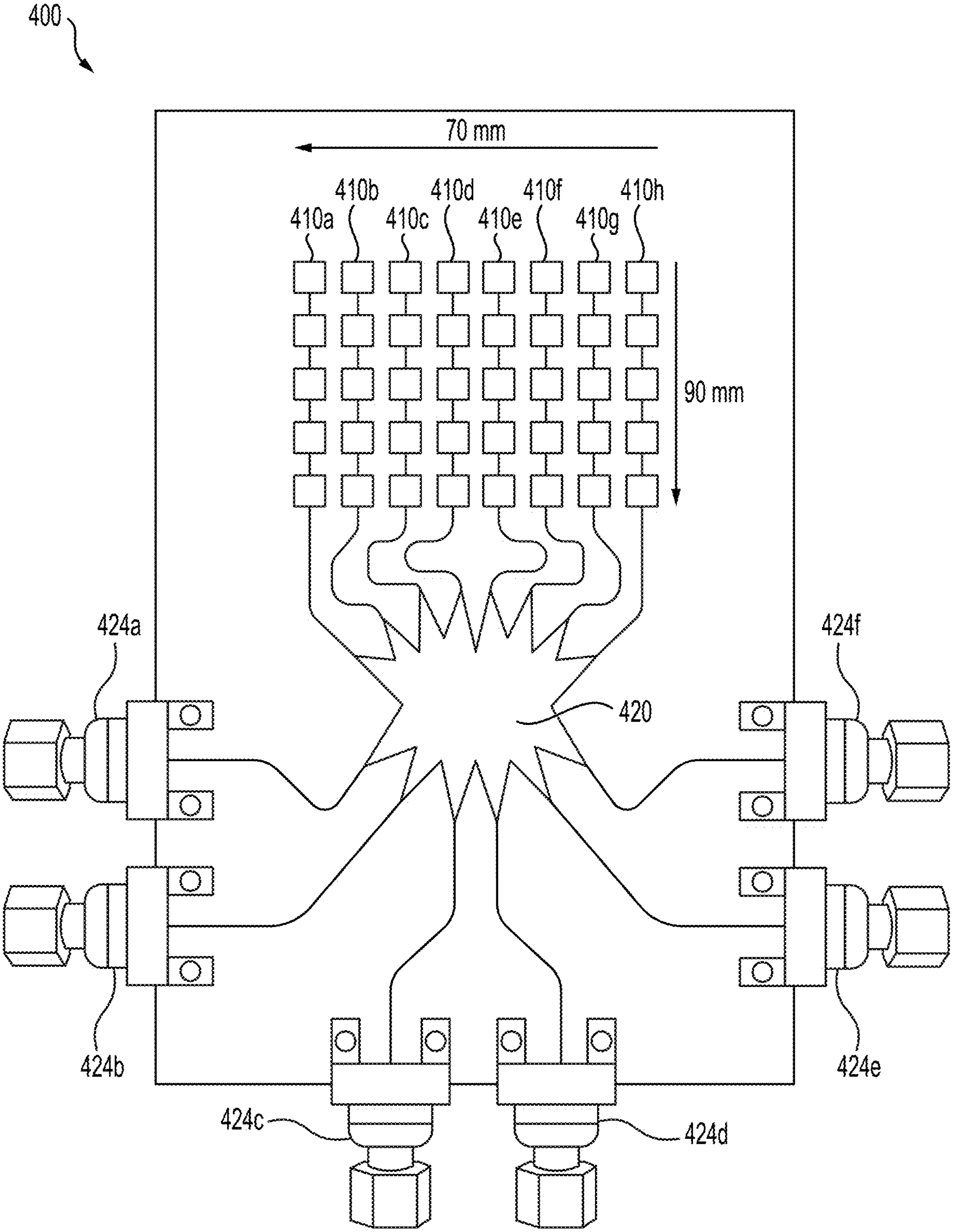
FIG. 4 is an image of a flexible Rotman-Lens-Based antenna array, in accordance with an example of the present disclosure.

FIG. 4 is an image of a flexible Rotman-Lens-Based antenna array 400, in accordance with an example of the present disclosure. As depicted, flexible Rotman-Lens-Based antenna array 400 can include eight antenna arrays 410$a$-410$h$ connected to a Rotman lens 420 and six beam ports 424$a$-424. Each antenna array 410$a$-410$h$ can include five serially fed patch antennas, providing an operation centered at 28.5 GHz with a reflection coefficient lower than—20 dB within this range. Each beam port 424$a$-424 can be connected to a connector configured to integrate within an retrodirective backscatter front end system as previously described and/or with an energy harvesting system as further described herein. As depicted, both the antenna arrays 410$a$-410$h$ and the Rotman lens 420 are printed on the same side of the substrate. However, the disclosure is not so limited. For example, in some examples, the antenna arrays 410$a$-410$h$ and the Rotman lens 420 could be on different layers of a substrate in order to reduce the geometric footprint. Further, in another example, the antenna arrays 410$a$-410$h$ and/or the Rotman lens 420 can be “folded” over multiple layers of a circuit.

Figure 5:
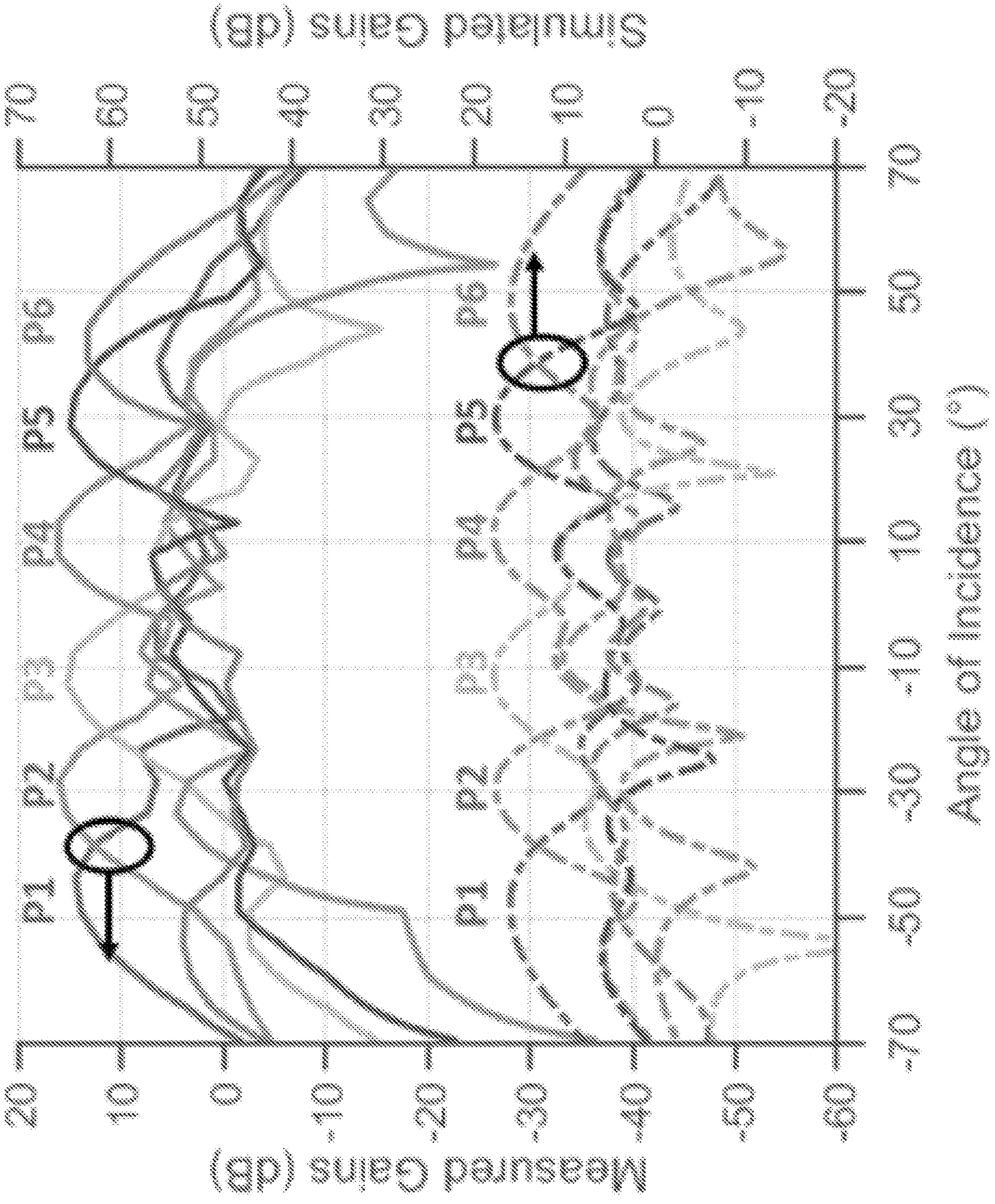
FIG. 5 is a chart depicting measured and simulated radiation patterns and gains of the example flexible Rotman-Lens-Based antenna array of FIG. 4, in accordance with an example of the present disclosure.

FIG. 5 is a chart depicting measured and simulated radiation patterns and gains of the example flexible Rotman-Lens-Based antenna array 400 of FIG. 4, in accordance with an example of the present disclosure. The radiation properties of the flexible Rotman-Lens-Based antenna array 400 were simulated using a time-domain solver. As depicted, both the simulated and measured radiation patters display similarity with a measured gain of approximately 17 dBi, and an angular coverage of around 110°, thereby validating the operation of the flexible Rotman-Lens-Based antenna array 400.

Figure 6:
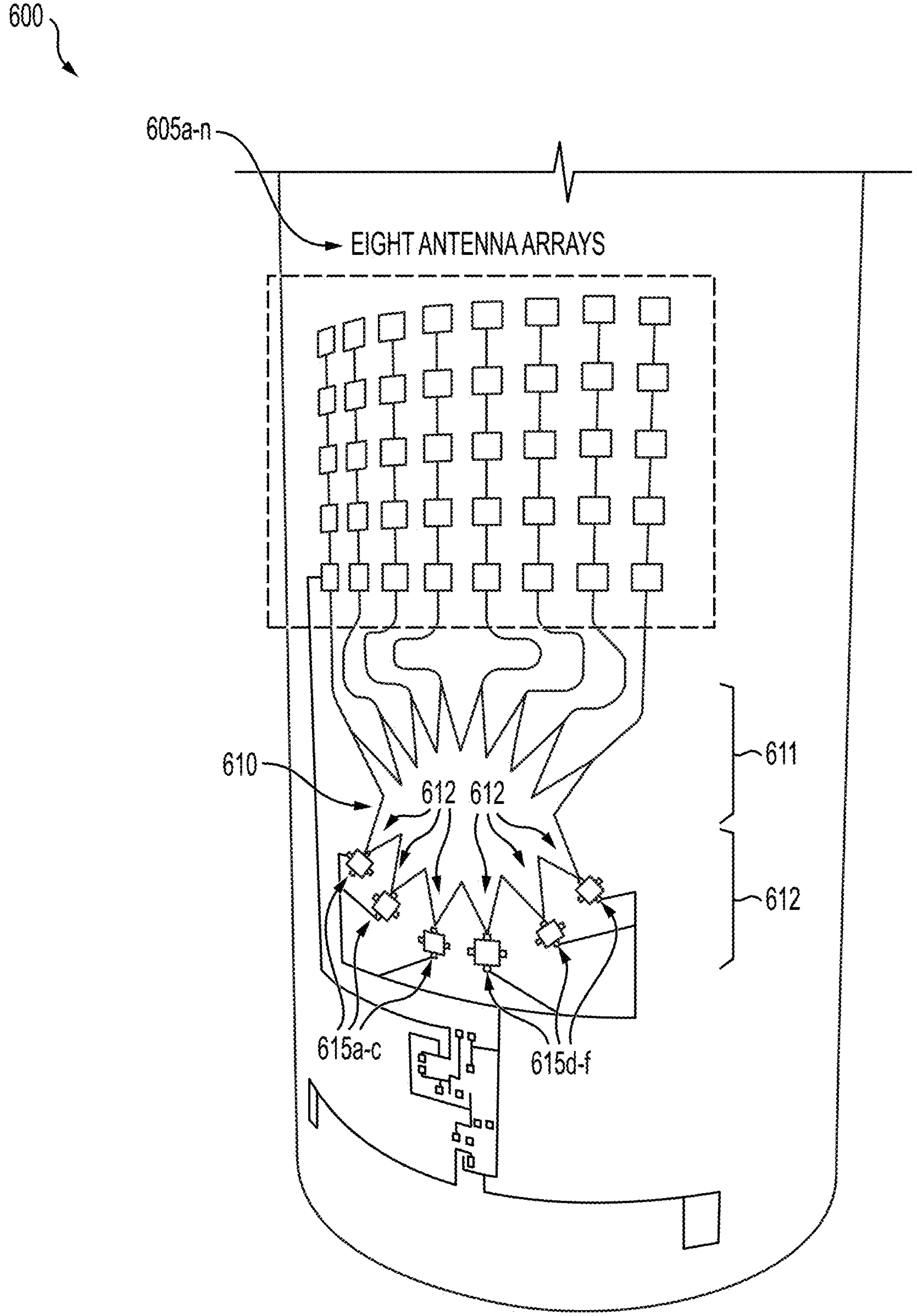
FIG. 6 is an image of a flexible Rotman lens-based retrodirective backscatter front end system, in accordance with an example of the present disclosure.

FIG. 6 is an image of a flexible Rotman lens-based retrodirective backscatter front end system 600, in accordance with an example of the present disclosure. As shown, retrodirective backscatter front end system 600 can include one or more antenna array 605$a$-$n$, a Rotman lens 610 having an antenna side 611 and a beam port side 612, and one or more switches 615$a$-615$f$. As further depicted, Rotman lens 610 may include one or more antenna port on the antenna side 611 and one or more beam port on the beam port side 612. The one or more antenna port of the antenna side 611 of the Rotman lens 610 can be in electrical communication with a respective antenna of the one or more antenna array 605$a$-$n$. The one or more beam port of the beam port side 612 of the Rotman lens 610 can be in electrical communication with a respective switch of the one or more switches 615$a$-615$f$. Retrodirective backscatter front end system 600 of FIG. 6 can be used to receive electromagnetic energy, by one or more antenna 605$a$-$n$, focus the energy, by a Rotman lens 610, onto one or more switches 615*a*-615*f*, and then modulate the reflected signal by passing it through a selected load into an output line.

As will be appreciated, the various components of the flexible Rotman lens-based retrodirective backscatter front end system 600 can be manufactured such that the system can maintain stability upon bending. For example, one or more antenna array 605*a-n* and Rotman lens 610 can be printed on copper-clad liquid crystal polymer (LCP) using an inkjet-printed masking technique followed by etching. As will be appreciated, such an architecture can lead to the fabrication of flexible mm-wave devices that can cover wide areas of space while being electrically large and benefit from the associated improvements in link budget and, more importantly, turn-on sensitivity. Further, while both the antenna arrays 605*a-n* and the Rotman lens 610 are printed on the same side of the substrate, the disclosure is not so limited. For example, in some examples, the antenna arrays 605*a-n* and the Rotman lens 610 could be on different layers of a substrate in order to reduce the geometric footprint. Further, in another example, the antenna arrays 605*a-n* and/or the Rotman lens 610 can be "folded" over multiple layers of a circuit.

Figure 7:
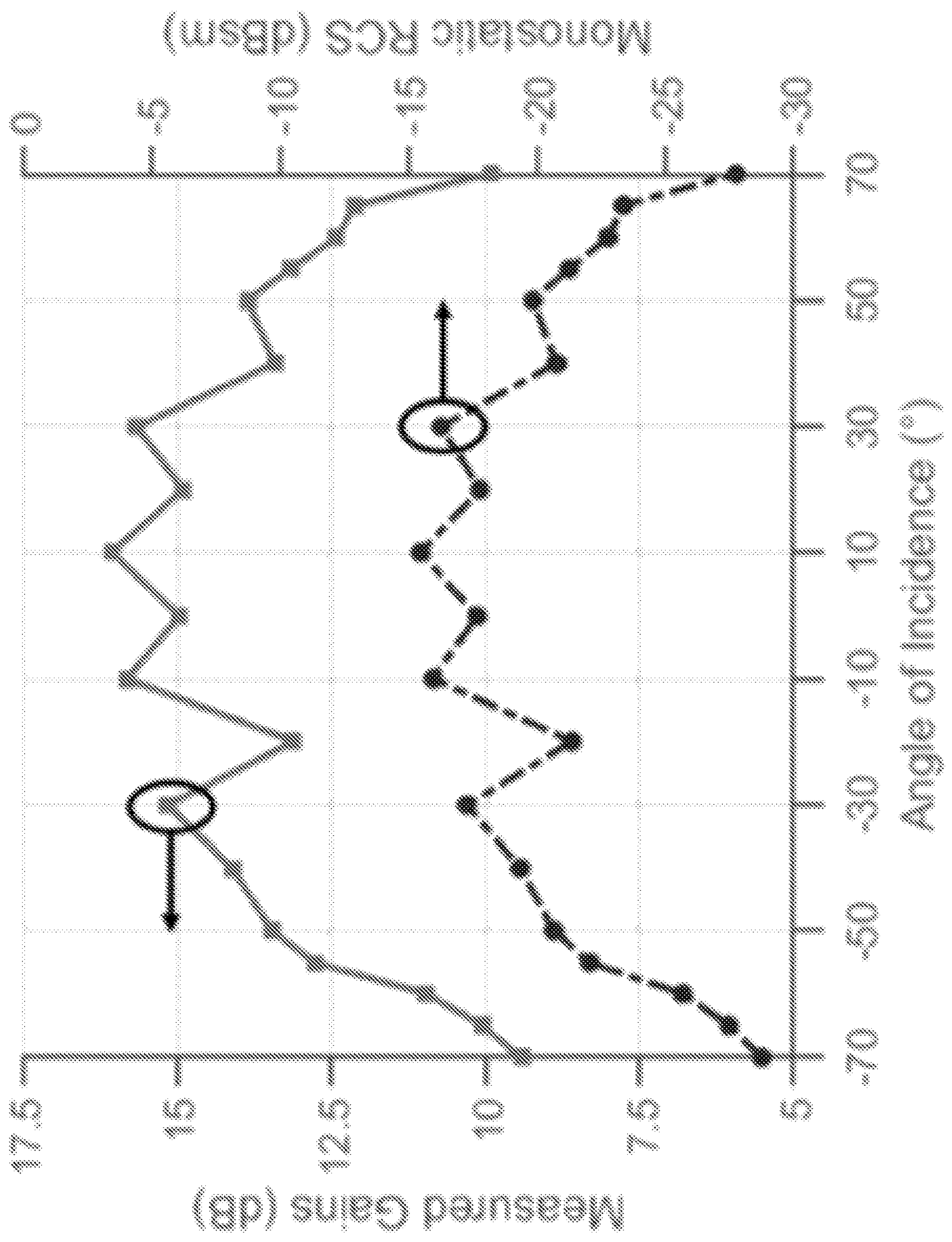
FIG. 7 is a chart depicting the measured monostatic differential radar cross section (RCS) in addition to the extracted gain of the flexible Rotman lens-based retrodirective backscatter front end system of FIG. 6, in accordance with an example of the present disclosure.
Figure 8:
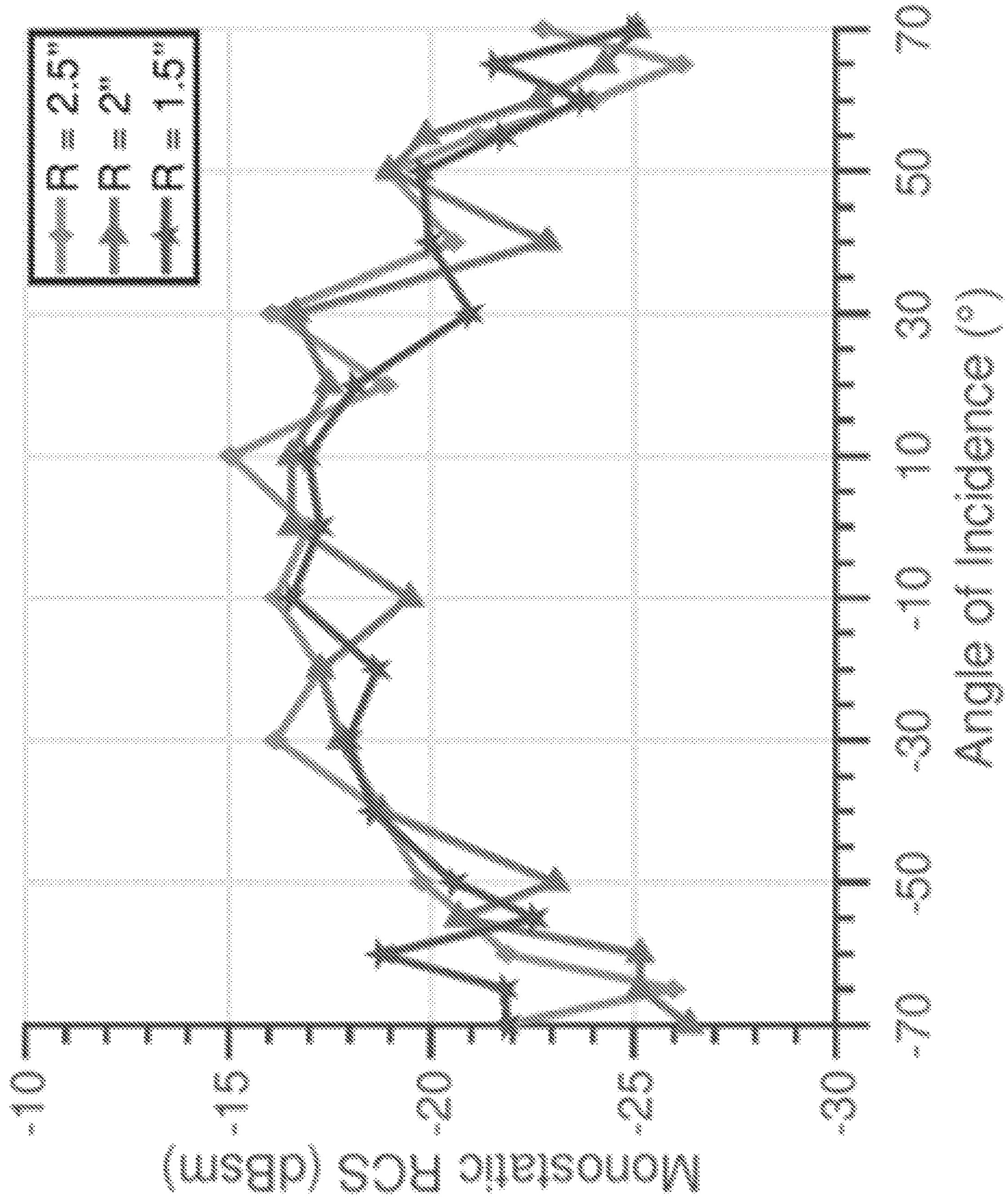
FIG. 8 is a chart depicting the measured monostatic differential radar cross section (RCS) of the flexible Rotman lens-based retrodirective backscatter front end system of FIG. 6 for three different bending scenarios, in accordance with an example of the present disclosure.

FIG. 7 is a chart depicting the measured monostatic differential radar cross section (RCS) in addition to the extracted gain of the flexible Rotman lens-based retrodirective backscatter front end system 600 of FIG. 6, in accordance with an example of the present disclosure. As shown, the results, measured at the optimal frequency of 28.5 GHz display a maximum RCS of 15.4 dBsm, with a variation of less than 8 dB from. Accordingly, the flexible Rotman lens-based retrodirective backscatter front end system 600 displays a high and largely isotropic differential RCS. In order to assess the effect of bending on the RCS behavior of the flexible Rotman lens-based retrodirective backscatter front end system 600 was placed on three different cylinders with being radii ranging from 1.5" to 2.5." FIG. 8 is a chart depicting the measured monostatic differential radar cross section (RCS) of the flexible Rotman lens-based retrodirective backscatter front end system 600 of FIG. 6 for three different bending scenarios, in accordance with an example of the present disclosure. As shown, the flexible Rotman lens-based retrodirective backscatter front end system 600 depicts high stability and robustness under bending with a measured variation of the RCS being less than 8 dB.

Figure 9:
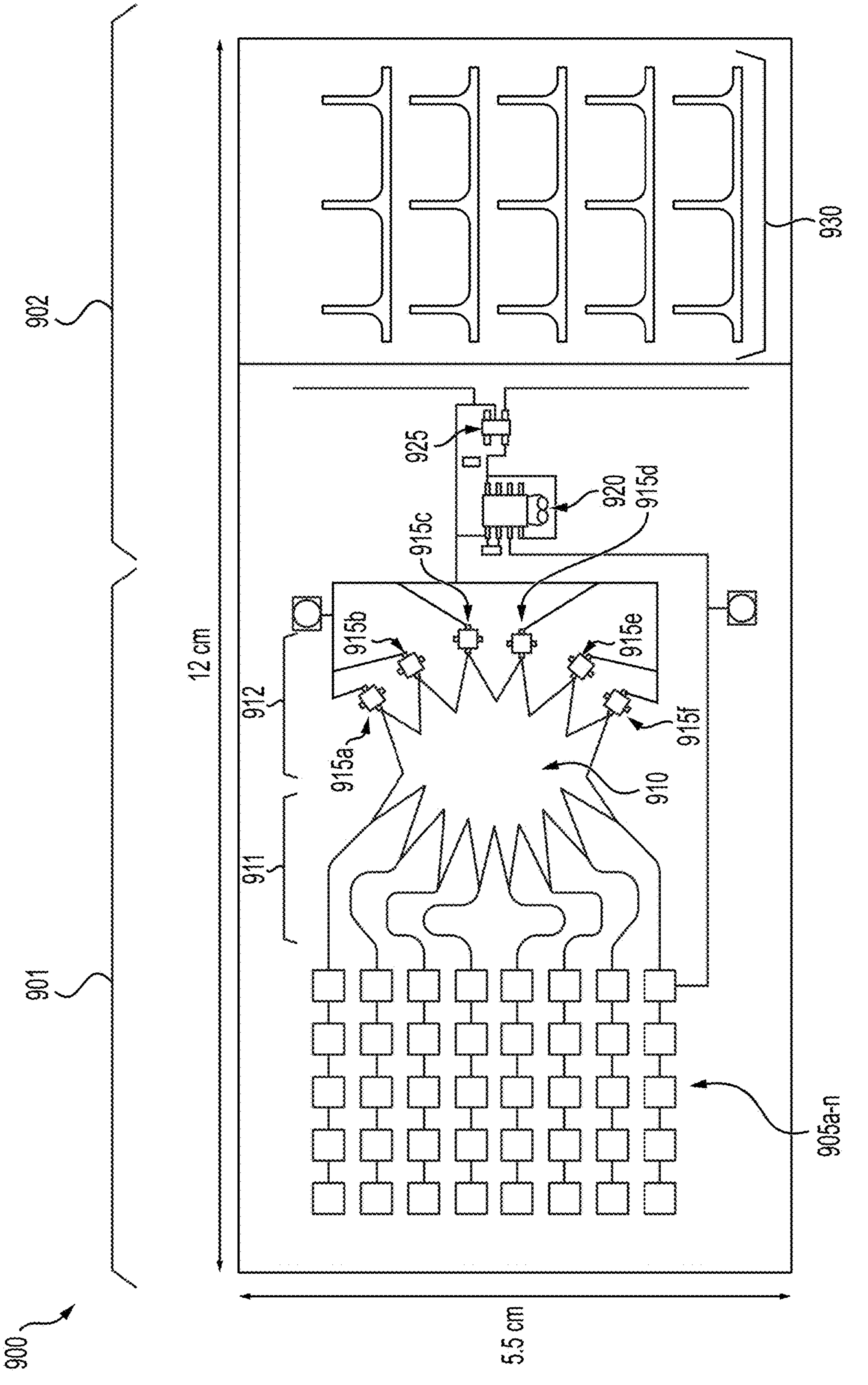
FIG. 9 is an image of a fully flexible power-autonomous Rotman-based semi-passive RFID system 900, in accordance with an example of the present disclosure

FIG. 9 is an image of a fully flexible power-autonomous Rotman-based semi-passive RFID system 900, in accordance with an example of the present disclosure. As shown, a fully flexible power-autonomous Rotman-based semi-passive RFID system 900 includes a flexible Rotman lens-based retrodirective backscatter front end system 901 and energy system 902. Flexible Rotman lens-based retrodirective backscatter front end system 901 can include one or more antenna array 905*a-n*, a Rotman lens 910 having an antenna side 911 and a beam port side 912, and one or more switches 915*a*-915*f*. As further depicted, Rotman lens 910 may include one or more antenna port on the antenna side 911 and one or more beam port on the beam port side 912. The one or more antenna port of the antenna side 911 of the Rotman lens 910 can be in electrical communication with a respective antenna of the one or more antenna array 905*a-n*. The one or more beam port of the beam port side 912 of the Rotman lens 910 can be in electrical communication with a respective switch of the one or more switches 915*a*-915*f*. Energy system 902 can include a low-power oscillator 920, a voltage regulator 925, and a power source 930. As shown, power source includes a flexible solar cell.

Further, while all of the components of the RFID system 900 are depicted as being printed on the same side of the substrate, the disclosure is not so limited. For example, in some examples, the antenna arrays 905*a-n* and the Rotman lens 910 could be on different layers of a substrate in order to reduce the geometric footprint. Further, in another example, the antenna arrays 905*a-n* and/or the Rotman lens 910 can be "folded" over multiple layers of a circuit. Additionally, the backscatter front end system 901 and energy system 902 and/or their various sub components could be placed on or across multiple layers.

Figure 10:
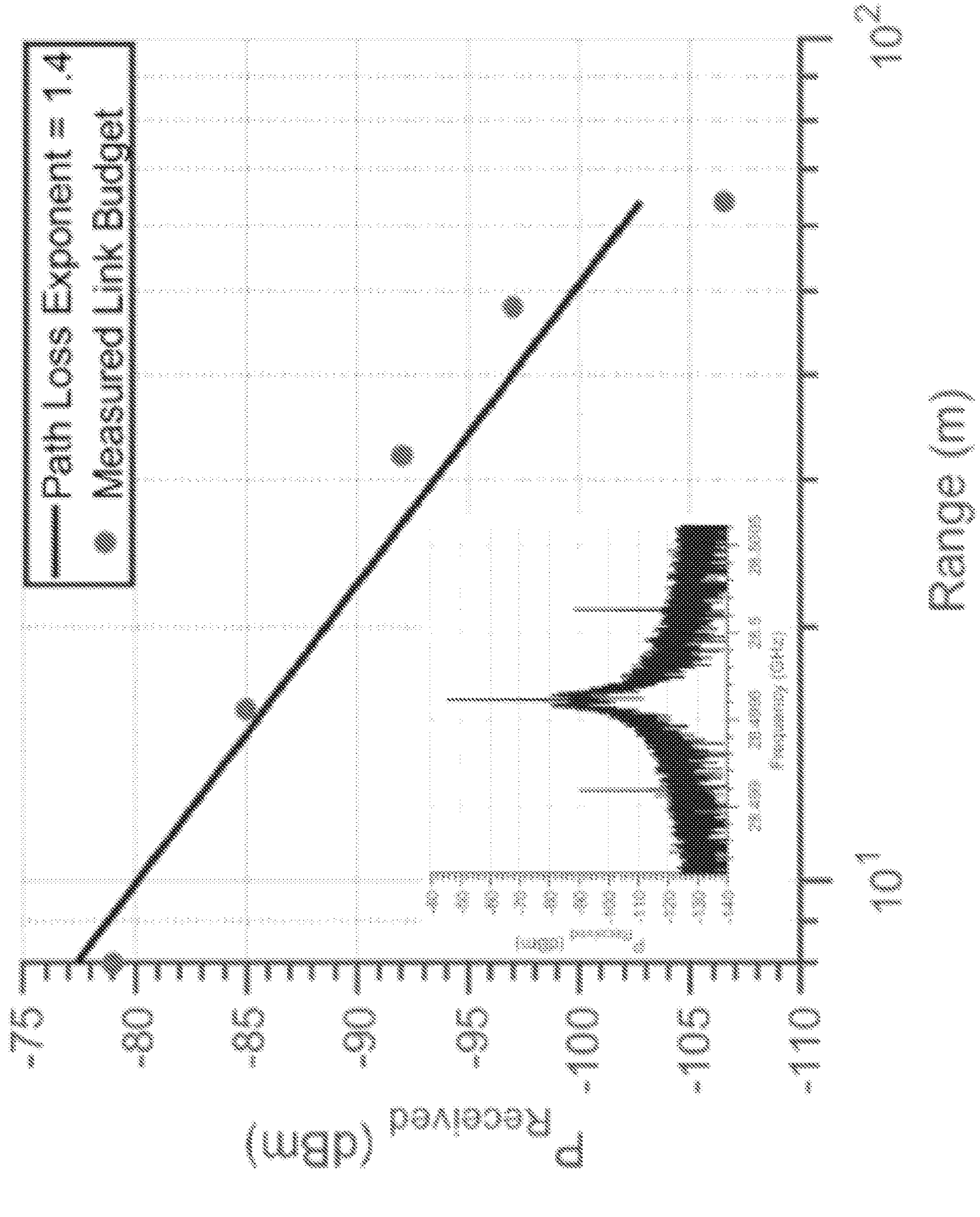
FIG. 10 is a graph depicting simulation/testing results for received power versus range of a fully flexible power-autonomous Rotman-based semi-passive RFID tag of FIG. 9 for a single power spectrum, in accordance with an example of the present disclosure.

FIG. 10 is a graph depicting simulation/testing results for received power versus range of a fully flexible power-autonomous Rotman-based semi-passive RFID system 900 of FIG. 9 for a single power spectra, in accordance with an example of the present disclosure. As shown in FIG. 10, the measurements were consistent with a Path Loss Exponent (PLE) of 1.4.

Figure 11:
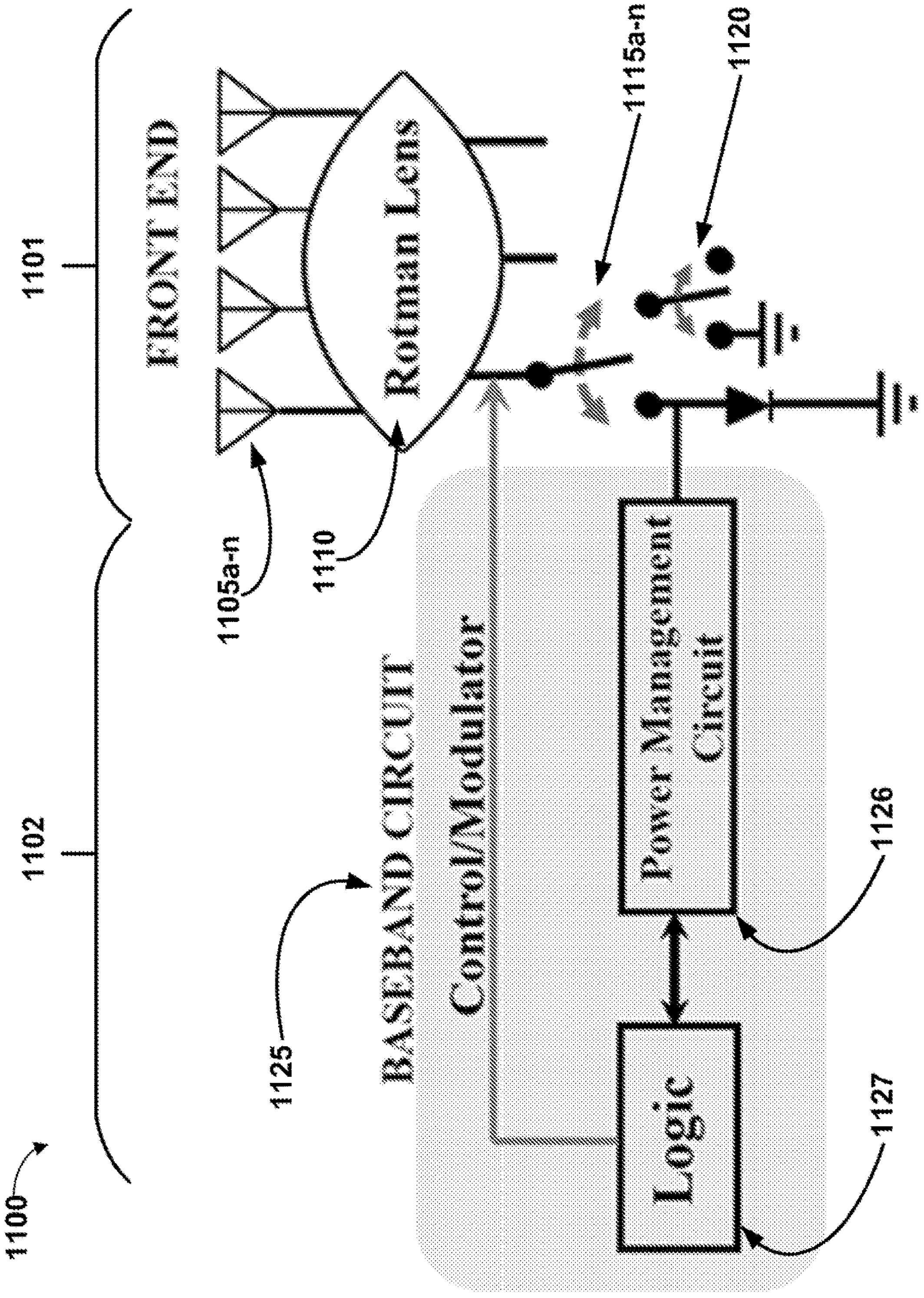
FIG. 11 is an schematic of a fully flexible power-autonomous Rotman-based fully passive RFID system, in accordance with an example of the present disclosure.

FIG. 11 is an schematic of a fully flexible power-autonomous Rotman-based fully passive RFID system 1100, in accordance with an example of the present disclosure. As shown, the fully passive RFID system 1100 can include antennas 1105*a-n* connected to the Rotman lens 1110 on one side and Single Pole Double Throw (SPDT) switches 1115*a-n* on the beam ports. As depicted, each SPDT switch 1115*a-n* can include a first output connected to a backscattering circuit 1120 and a second output connected to an energy harvesting circuit 1125. As will be appreciated, such a configuration allows the fully flexible power-autonomous Rotman-based fully passive RFID system 1100 fully flexible power-autonomous Rotman-based fully passive RFID system 1100 to have two modes of operation: harvesting or backscattering communication. For backscattering mode, the switch 1115 shifts between two phases to modulate the reflected signal. For example, the backscattering circuit 1120 can include a second switch configured to modulate the signal by switching between the harvester and the single open or short load.

For harvesting operation, the signals coming from the antennas 1105*a-n* are combined in the Rotman lens 1110 and fed to a power management circuit 1126. For example, power management circuit 1126 can include one or more rectifiers that output the DC power to be stored elsewhere in the power management circuit 1126. The one or more rectifier, as discussed further herein with reference to FIG. 12, can include a diode, such as, for example, a Schottky Diode, a capacitor, and an output path. For example, the one or more rectifier can include a diode coupled to a capacitor for short term storage and may include an output path to provide power to a load.

Additionally, and as depicted, the SPDT switches 1115*a-n* can be controlled by a logic circuit 1127 in the energy harvesting circuit 1125. In another example, the connections between the power management circuit 1126 and the rectifiers can be actively reconfigured based on a determination of which rectifier is in an active state. As will be appreciated, such a design would remove the need for bypass diodes and their associated voltage drop.

Further, while the RFID system 1100 is depicted and described above with a SPDT switch that alternatively connects two different loads, the disclosure is not so limited. For example, in some examples the RFID system 1100 can be configured connect to more than two loads. For instance, the RFID system 1100 could be configured to implement quadrature phase shift keying (QPSK), which would require 4 loads. Further, the system could be configured to implement various quadrature amplitude modulations (QAM)

schemes (e.g., 16QAM would require 16 loads that change both the reflection's phase and its amplitude, etc.).

Figure 14:
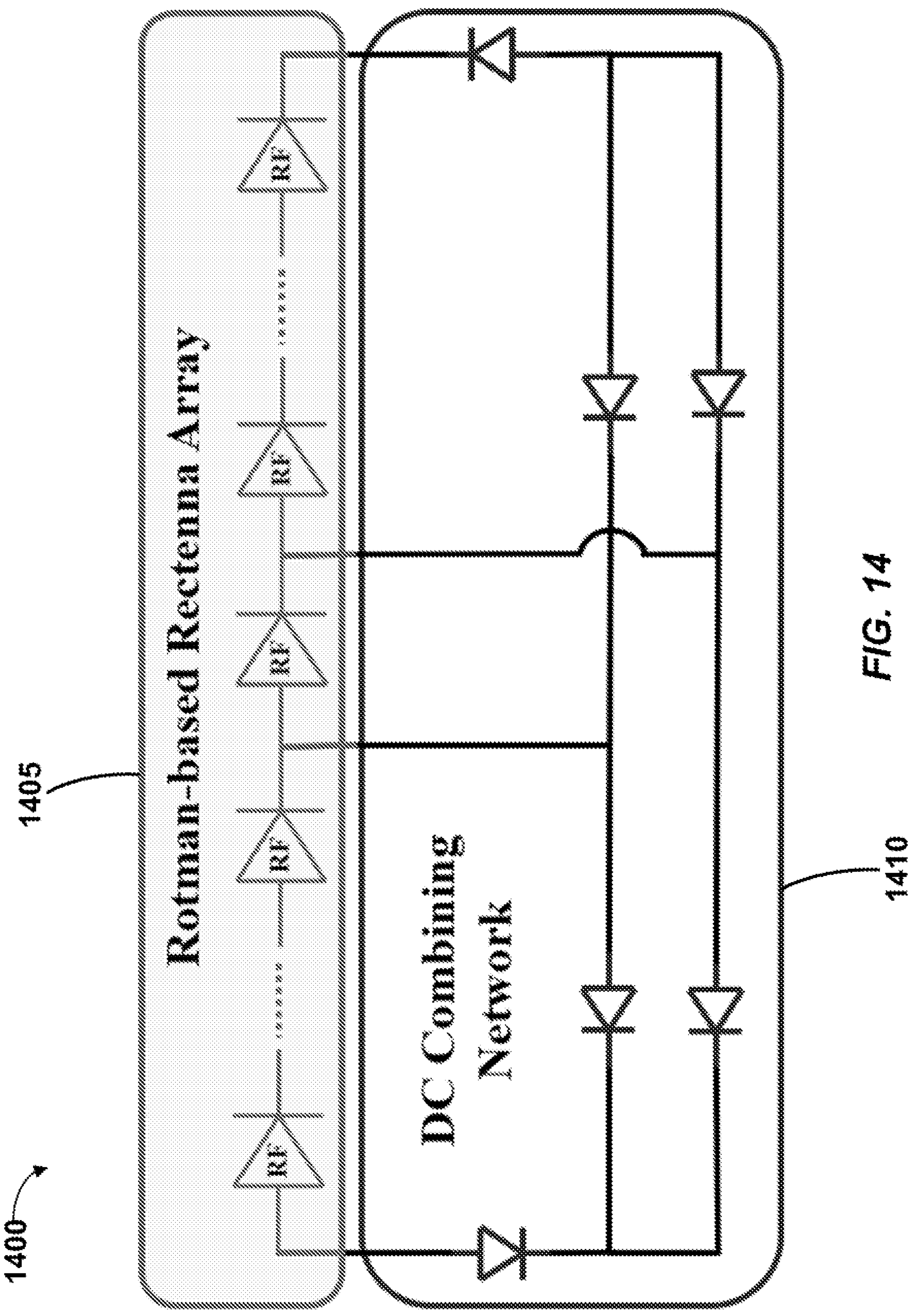
FIG. 14 depicts a block diagram of a power combining network, in accordance with an example of the present disclosure.
Figure 15:
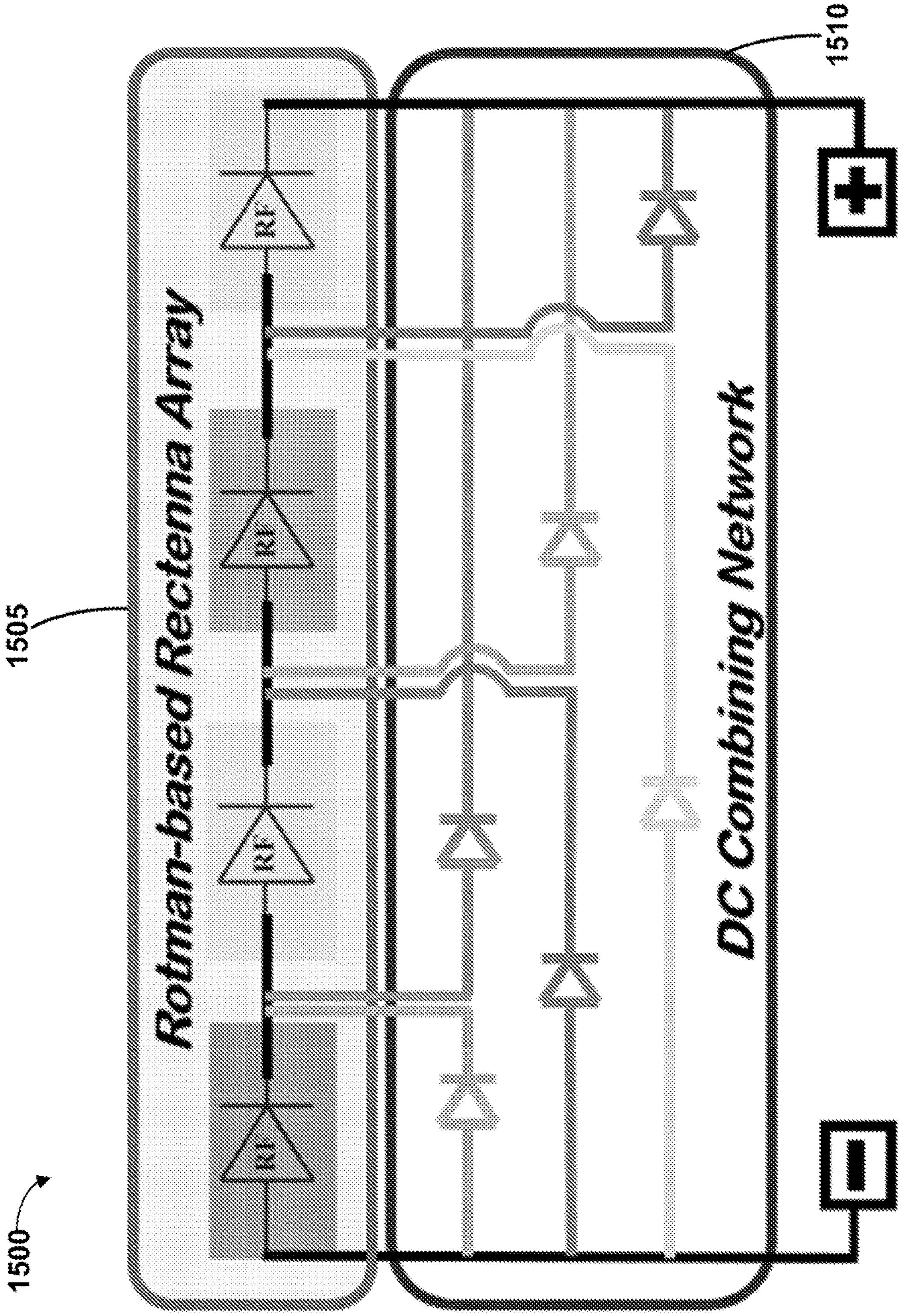
FIG. 15 depicts a block diagram of a power combining network, in accordance with an example of the present disclosure.

Additionally, the power management circuit 1126 can include a power combining network, described further herein with reference to FIGS. 14 and 15, which may be configured to combine the DC signals into an output path. For example, the dc outputs of the one or more rectifier can be serially combined by the power combining network to feed their output power to the load, or storage circuit. The power combining network can include a DC combining network having a plurality of diodes. For example, power combining network can include a total of 2×N diodes, where N is the number of rectifying diodes of the one or more rectifier. In another example, power combining network can include a total of 2×(N−1) diodes, where N is the number of rectifying diodes of the one or more rectifier.

As will be appreciated, the present disclosure can enable digital twinning technology in scenarios such as smart cities or smart agriculture, for which billions of IoT devices will be deployed and will be required to be energy-autonomous and able to communicate sensing and identifications data. By connecting the sensors to a power-autonomous Rotman-based fully-passive RFID system 1100 and placing them on buildings, bridges, roads, etc. (in the scenario of smart cities) or in agricultural fields, in the vicinity of 5G/mm-wave base-stations, such fully-energy-sustained IoT sensors can be powered and interrogated using cellular infrastructure. Further, such base stations are not limited to large scale cellular towers. As will be appreciated, such base station can be deployed in more distributed embodiments. For example, they could be deployed in small footprints capable of being both outdoors and indoors (such as in malls, grocery shops, warehouses, etc.).

In order to active/initialize such sticker-like (or other format) Rotman-enabled device (e.g., sensors having an fully-passive RFID system 1100) after installation, an active transmitter needs to be used by the installer to send a message to local 5G base-stations that can be used for them to record the direction of the installed device. Once installation occurs, the base-stations can then regularly aim at the device until it has acquired enough energy to run a measurement and communications cycle. Once the device has acquired enough energy, the logic circuit 1127 causes the switches 1115*a-n* to switch the device into backscatter mode to send information to the powering base-stations. Once the message is received by the base-stations, these interrupt their service to the device until the next cycle is triggered. In some embodiments, this process can be implemented in a position-agnostic fashion whereby the base-station has to scan the environment for tags. Once triggered, these could communicate back, and the base-station would also be able to track their positions.

As will be appreciated, such embodiments allow for targeted wireless power transmission to such devices as those described herein. As further described with respect to FIG. 16 below, such described Rotman-enabled systems may be incorporated in a plurality of different types of electronic devices. For example, such systems may be incorporated into user devices, such as cell phones. As will be appreciated, such a device could be provided with targeted wireless power transfer from a base station. As will be further appreciated, such an embodiment could allow for base station providers to provide users with device power in similar format and business model that that of cellular data.

Figure 12:
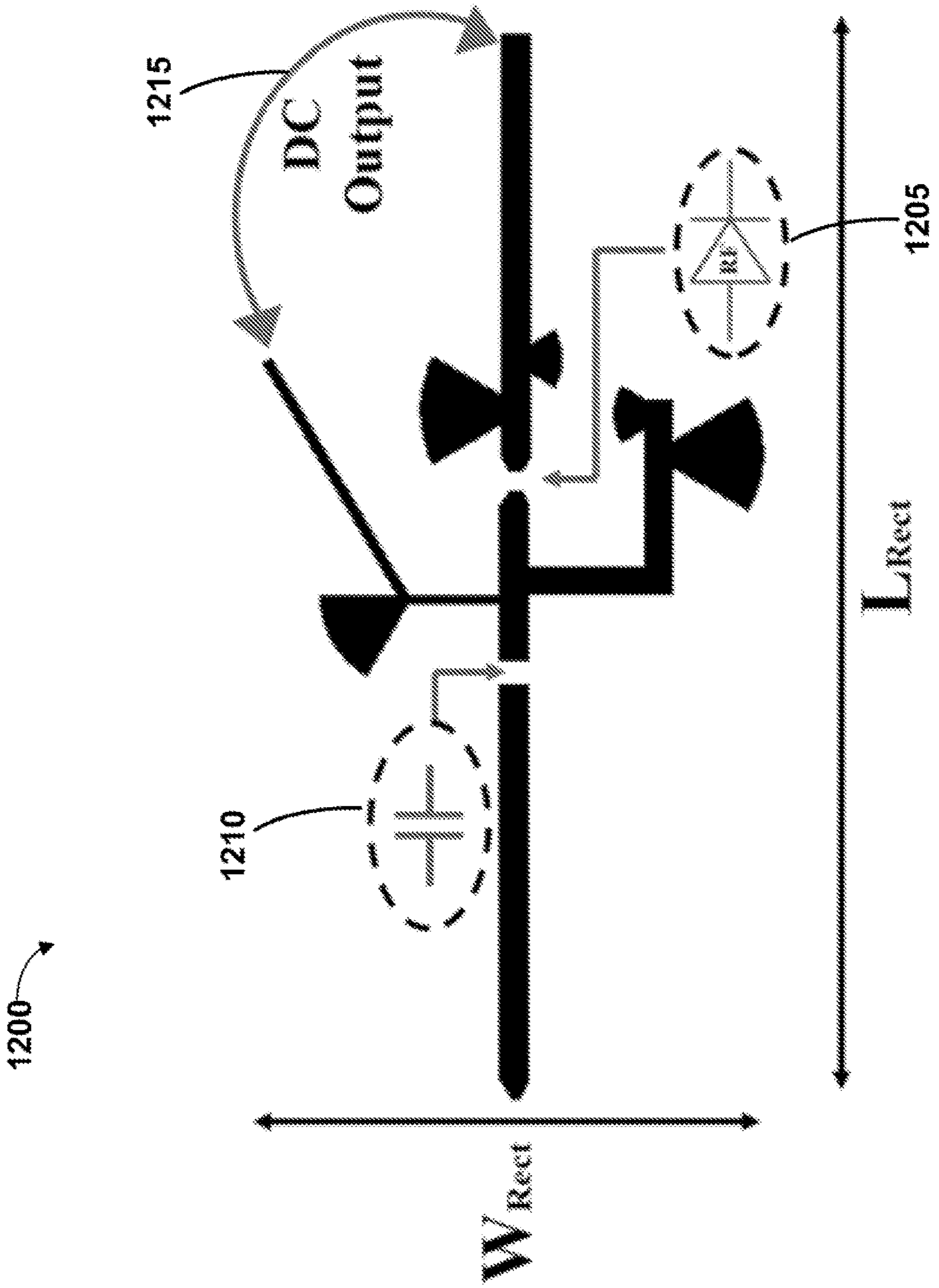
FIG. 12 is a schematic of a rectifier, in accordance with an example of the present disclosure.
Figure 13:
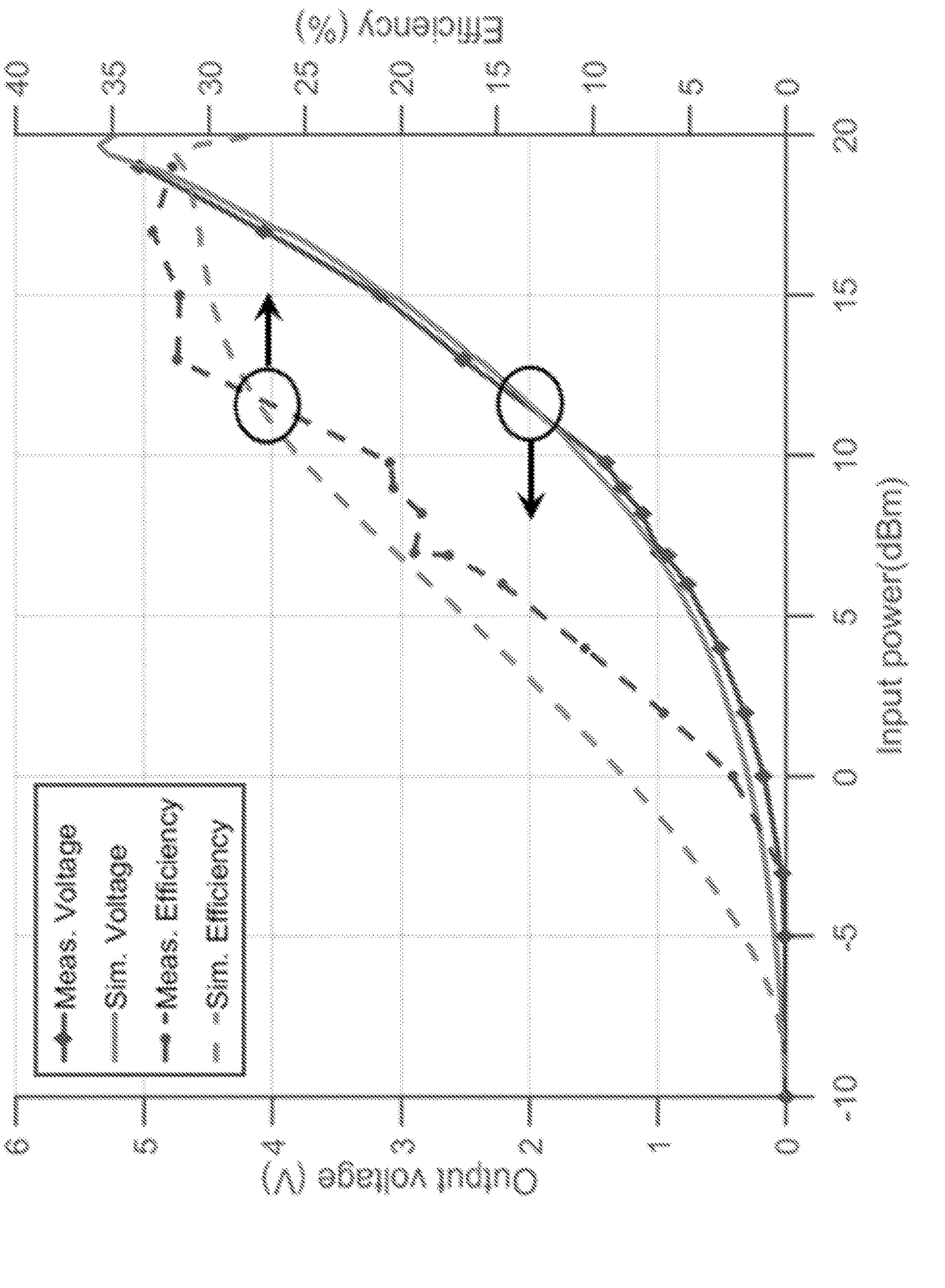
FIG. 13 is a chart depicting the simulated and measured voltages and power conversion efficiencies of the example rectifier of FIG. 13, in accordance with an example of the present disclosure.

FIG. 12 is a schematic of a rectifier 1200, in accordance with an example of the present disclosure. As depicted, rectifier 1200 can include a diode 1205, a capacitor 1210, and a DC output 1215. Diode 1205 can include a diode with low series resistance and high cut-off frequency. For example, diode 1205 can be a Schottky diode, such as, for example, a packaged gallium arsenide beam-lead Schottky barrier diode. Capacitor 1210 can include an ultra-broadband capacitor and can serve as a DC block for rectifier 1200. Capacitor 1210 can be connected to a quarter-wave radial stub. As will be appreciated, the stub will provide a virtual short-circuit used to isolate a DC port of the rectifying diode 1205. Rectifier 1200 can further include an L-network to provide matching at the input to the diode 1205. Additionally, rectifier 1200 can include two quarter-wave radial stubs configured to counteract the fundamental and second harmonic byproducts of the rectifier 1200. Additionally, rectifier 1200 can be manufactured on various substrates. For example, rectifier 1200 can be printed on copper-clad Rogers crystal polymer (LCP) using an inkjet-printed masking technique followed by etching. FIG. 13 is a chart depicting the simulated and measured voltages and power conversion efficiencies of the example rectifier 1200 of FIG. 12, in accordance with an example of the present disclosure. As depicted, both simulated and measured voltages and power-conversion efficiencies (PCEs), for an input power ranging between 10 dBm and 20 dBm with the optimal 1 kΩ load of the structure, demonstrated better than −7 dB matching at 28.5 GHz over the entire power sweep. Further, rectifier 1200 demonstrates a very high sensitivity with turn-on power of as low as 10 dBm. Additionally, rectifier 1200 demonstrates a constant increase in the output voltage and efficiency until 20 dBm.

FIG. 14 depicts a block diagram of a power combining network 1400, in accordance with an example of the present disclosure. As shown, power combining network 1400 comprises Rotman-based rectenna array 1405, as previously described and DC combining network 1410. DC combining network 1410 introduces a minimalist architecture relying on a total of 2×N bypass diodes, where N is the number of RF or rectifying diodes. The bypass diodes can include a low turn-on voltage, such as roughly 0.1 V. As will be appreciated, such a design creates a low resistance current path around all other rectifiers that received very low or close to zero RF power making this topology optimal when only one diode is turned on, which can be assumed if a single, dominant source of power irradiates from a given direction.

FIG. 15 depicts a block diagram of a power combining network 900, in accordance with an example of the present disclosure. As shown, power combining network 900 comprises Rotman-based rectenna array 905 and DC combining network 910. DC combining network 910 introduces a minimalist architecture relying on a total of 2×(N−1) bypass diodes, where N is the number of RF or rectifying diodes. The bypass diodes can include a low turn-on voltage, such as roughly 0.1 V. As will be appreciated, such a design creates a low resistance current path around all other rectifiers that received very low or close to zero RF power making this topology optimal when only one diode is turned on, which can be assumed if a single, dominant source of power irradiates from a given direction. As depicted, Rotman-based rectenna array 905 can include four rectifying diodes and DC combining network 910 can include six bypass diodes. Additionally, DC combining network 910 can be manufactured on various substrates. For example, DC combining network 910 can be fabricated on a flexible 125 μm thin polyimide Kapton substrate. Further, DC combining network 910 can be connected to the Rotman-based rectenna array 905 through a series of single connectors. As will be appreciated, such a design will make power combining network 900 fully flexible and bendable.

Figure 16:
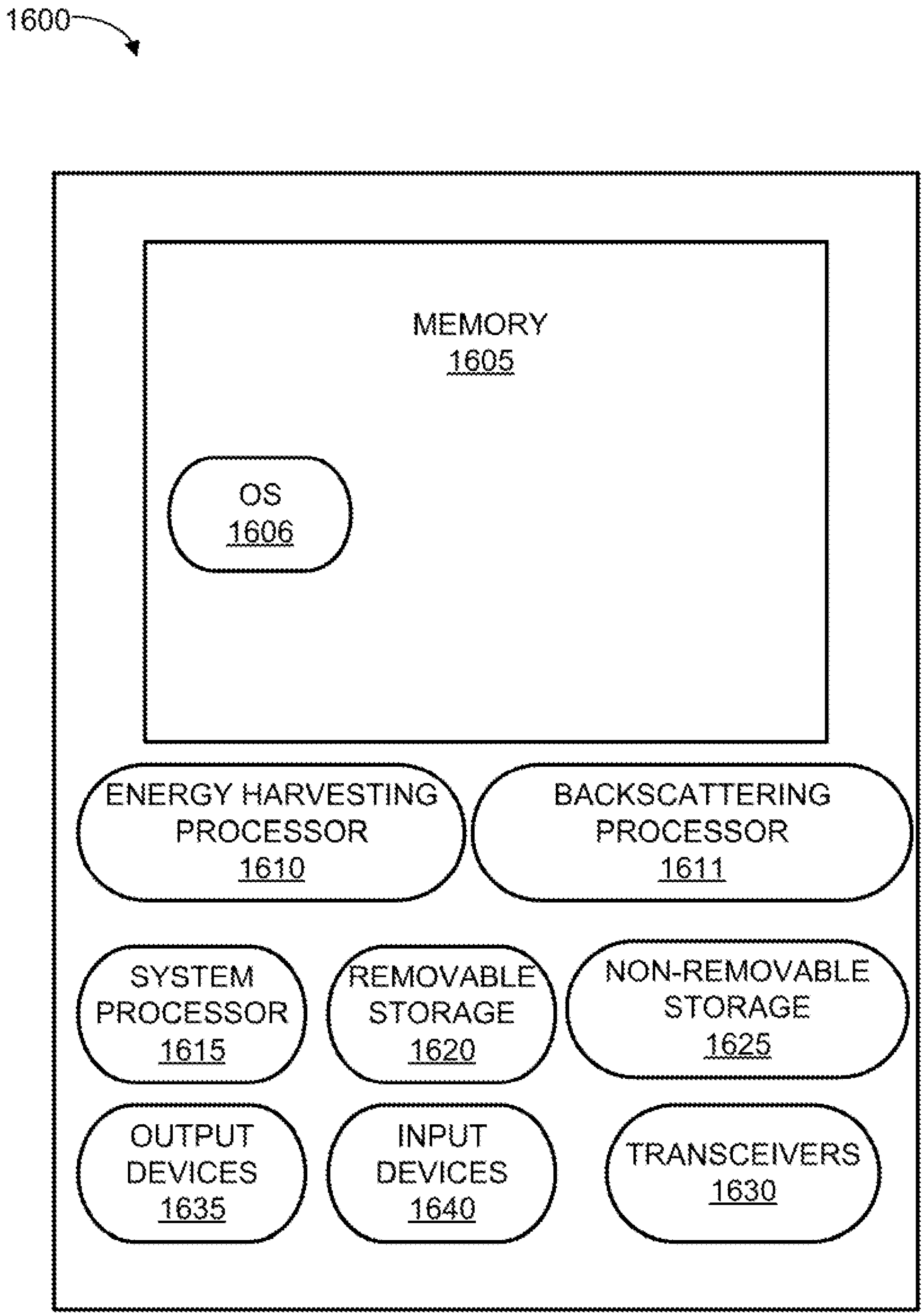
FIG. 16 is an example of an electronic device for use with the systems and methods disclosed herein, in accordance with some examples of the present disclosure.

FIG. 16 is an example of an electronic device 1600 for use with the systems and methods disclosed herein, in accordance with some examples of the present disclosure. As discussed below, electronic device 1600 may comprise memory 1605 including many common features such as, for example, operating system (OS) 1606. The electronic device 1600 may also comprise one or more energy harvesting processor 1610 and one or more system processors 1615. In some implementations, the system processor(s) 1615 can include a central processing unit (CPU), a graphics processing unit (GPU), or both CPU and GPU, or any other sort of processing unit. The electronic device 1600 may also include one or more of removable storage 1620, non-removable storage 1625, one or more transceiver(s) 1630, output device(s) 1635, and input device(s) 1640.

Energy harvesting processor 1610 may be configured to perform one or more operations associated with energy harvester systems, such as for example those described herein. For example, energy harvesting processor 1610 may determine a first power level associated with a first power source of electronic device 1600. Further, energy harvesting processor 1610 may compare the first power level to a predetermined power threshold. Additionally, responsive to determining that the first power level falls below a first power threshold, energy harvesting processor 1610 may transmit instructions cause the output of a power combining network, such as those described herein, to be in electrical communication with the first power source. Energy harvesting processor 1610 can be further configured to wake up electronic device 1600. For example, if the lens system is illuminated with enough power by an RF source, the output voltage can be used to turn-on a micro-controller (e.g., energy harvesting process 1610) by either generating a signal that triggers the controller or by charging a capacitor that would hold enough energy for the system to operate for one or several cycles. Further, energy harvesting process 1610 can be configured pulse the power source to receive feedback (e.g., power levels, remaining lifetime, etc.). System processor 1615 may be configured to receive a request to connect to an external device (e.g., another electronic device 1600). The request may be received through input device 1640 and/or through automatic routing.

In various implementations, the memory 1605 may be volatile (such as random-access memory (RAM)), non-volatile (such as read-only memory (ROM), flash memory, etc.), or some combination of the two. The memory 1605 may include all, or part, of the functions 1607 and the OS 1606 for the electronic device 1600, among other things. The memory 1605 may also include the OS 1606. Of course, the OS 1606 varies depending on the manufacturer of the electronic device 1600 and currently comprises, for example, iOS 12.1.4 for Apple products and Pie for Android products. The OS 1606 contains the modules and software that supports a computer's basic functions, such as scheduling tasks, executing applications, and controlling peripherals.

The electronic device 1600 may also include additional data storage devices (removable and/or non-removable) such as, for example, magnetic disks, optical disks, or tape. Such additional storage is illustrated in FIG. 16 by removable storage 1620 and non-removable storage 1625. The removable storage 1620 and non-removable storage 1625 can store some, or all, of the instructions for the functionality of the electronic device 1600 and the OS 1606.

Non-transitory computer-readable media may include volatile and nonvolatile, removable and non-removable tangible, physical media implemented in technology for storage of information, such as computer readable instructions, data structures, program modules, or other data. The memory 1605, removable storage 1620, and non-removable storage 1625 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the electronic device 1600. Any such non-transitory computer-readable media may be part of the electronic device 1600 or may be a separate database, databank, remote server, or cloud-based server.

In some implementations, the transceiver(s) 1630 may include any sort of transceivers known in the art. In some examples, the transceiver(s) 1630 can include a wireless modem to facilitate wireless connectivity with the other electronic devices, the Internet, and/or an intranet via a cellular connection. Further, the transceiver(s) 1630 may include a radio transceiver that performs the function of transmitting and receiving radio frequency communications via an antenna (e.g., Wi-Fi or Bluetooth®). In other examples, the transceiver(s) 1630 may include wired communication components, such as a wired modem or Ethernet port, for communicating with the other electronic devices or the provider's Internet-based network.

In some implementations, output device(s) 1635 includes any sort of output devices known in the art, such as a display (e.g., a liquid crystal or thin-film transistor (TFT) display), a touchscreen display, speakers, a vibrating mechanism, or a tactile feedback mechanism. In some examples, output device(s) 1635 can play various sounds based on, for example, whether the electronic device 1600 is connected to a network or other device. Output device(s) 1635 also include ports for one or more peripheral devices, such as headphones, peripheral speakers, or a peripheral display.

In various implementations, input device(s) 1640 includes any sort of input devices known in the art. The input device(s) 1640 may include, for example, a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Certain embodiments of the disclosed technology are described above with reference to block and flow diagrams of systems and/or methods according to example embodiments of the disclosed technology. Some blocks of the block diagrams and flow diagrams may not necessarily need to be performed in the order presented, or may not necessarily need to be performed at all, according to some embodiments of the disclosed technology.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A semi-passive RFID system comprising:
- a Rotman Lens having an antenna side;
- one or more antennas in electrical communication with the antenna side of the Rotman Lens;
- a power generation circuit; and
- switches in electrical communication with a beam port side of the Rotman Lens.

2. The RFID system of claim 1, wherein the power generation circuit comprises a power source comprising a solar cell.

3. The RFID system of claim 2, wherein the switches comprise mm-wave switches;
- wherein the RFID system is configured to display simultaneous high gain and wide angular coverage, resulting in a measured variation of a radar cross section (RCS) in both planar and bending conditions of less than approximately 8 dB over an angular coverage of greater than approximately 110°;
- wherein the antenna side of the Rotman Lens comprises one or more antenna ports; and
- wherein each of the one or more antenna ports of the antenna side of the Rotman Lens are in electrical communication with a respective antenna of the one or more antennas.

4. The RFID system of claim 3, wherein there are eight antenna ports of the antenna side of the Rotman Lens and eight antennas.

5. The RFID system of claim 3, wherein the beam port side of the Rotman Lens comprises beam ports.

6. The RFID system of claim 5, wherein a respective mm-wave switch is connected to a respective beam port.

7. The RFID system of claim 1, wherein each of the one or more antennas is selected from a group consisting of a serially fed patch antenna and an omni-directional antenna.

8. The RFID system of claim 1, configured to display simultaneous high gain and wide angular coverage, resulting in a measured variation of a radar cross section (RCS) in both planar and bending conditions of less than approximately 8 dB over an angular coverage of greater than approximately 110°.

9. The RFID system of claim 8, wherein the antenna side of the Rotman Lens comprises one or more antenna ports;
- wherein a respective antenna port of the or more antenna ports is in electrical communication with a respective antenna of the one or more antennas; and
- wherein the system is configured to display simultaneous high gain of at least approximately 17 dBi and wide angular coverage of greater than approximately 120°.

10. The RFID system of claim 1 further comprising:
- a backscattering circuit electrically connected to a first output of each of the switches, the switches comprising single pole double throw switches; and
- an energy harvesting circuit electrically connected to a second output and a control input of each of the single pole double throw switches.

11. The RFID system of claim 10, wherein the energy harvesting circuit is configured to generate a control signal for controlling each of the single pole double throw switches.

12. The RFID system of claim 11, wherein the energy harvesting circuit comprises rectifiers and a power combining circuit.

13. The RFID system of claim 12, wherein each rectifier comprises a rectifying diode.

14. The RFID system of claim 13, wherein the power combining network comprises bypass diodes.

15. The RFID system of claim 14, wherein the number of bypass diodes is equivalent to 2×N, wherein N is the number of rectifying diodes.

16. The RFID system of claim 14, wherein the number of bypass diodes is equivalent to 2×(N−1), wherein N is the number of rectifying diodes.

17. The RFID system of claim 10, wherein the system is configured to provide at least 110° angular coverage at 28 GHz.

18. Electronics comprising:
- an environmental sensor; and
- the RFID system of claim 10.

19. An RFID system comprising:
- one or more antennas;
- a Rotman Lens having an antenna side in communication with one or more of the antennas;
- a switching network in communication with a beam port side of the Rotman Lens;
- a backscattering circuit in communication with a first output of the switching network; and
- an energy harvesting circuit in communication with a second output of the switching network;
- wherein the RFID system is configured to display simultaneous high gain and wide angular coverage, resulting in a measured variation of a radar cross section (RCS) in both planar and bending conditions of less than approximately 8 dB over an angular coverage of greater than approximately 120°.

20. A method of manufacturing the RFID system of claim 19 comprising:
- printing, on a flexible substrate, the one or more antennas and the Rotman Lens;
- affixing the switching network to the flexible substrate on the beam port side of the Rotman Lens;
- affixing the backscattering circuit to the flexible substrate such that the backscattering circuit is in communication with the first output of the switching network; and
- affixing the energy harvesting circuit to the flexible substrate such that the energy harvesting circuit is in communication with the second output of the switching network.

21. A fully-passive RFID system comprising:
- a Rotman Lens having an antenna side;
- one or more antennas in electrical communication with the antenna side of the Rotman Lens;
- a power generation circuit;
- single pole double throw switches in electrical communication with a beam port side of the Rotman Lens;

a backscattering circuit electrically connected to a first output of each of the single pole double throw switches; and an energy harvesting circuit electrically connected to a second output and a control input of each of the single pole double throw switches.

* * * * *